Nov. 10, 1942.     R. J. VEDOVELL     2,301,723
SEAL
Filed Sept. 30, 1938     3 Sheets-Sheet 1

Inventor:
Rudolph J. Vedovell,
By Cromwell, Greist + Warden
attys

Nov. 10, 1942.   R. J. VEDOVELL   2,301,723
SEAL
Filed Sept. 30, 1938   3 Sheets-Sheet 2
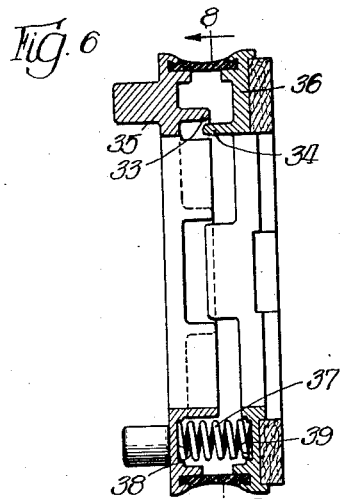
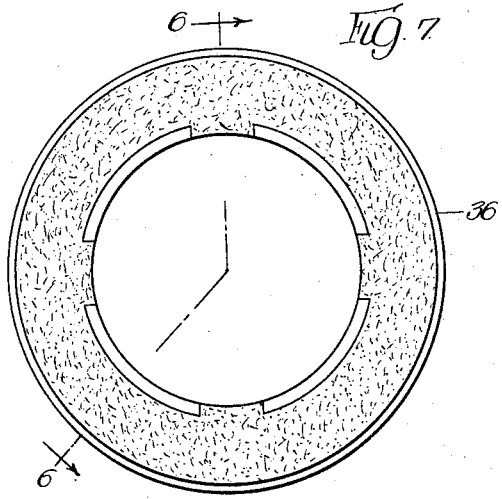
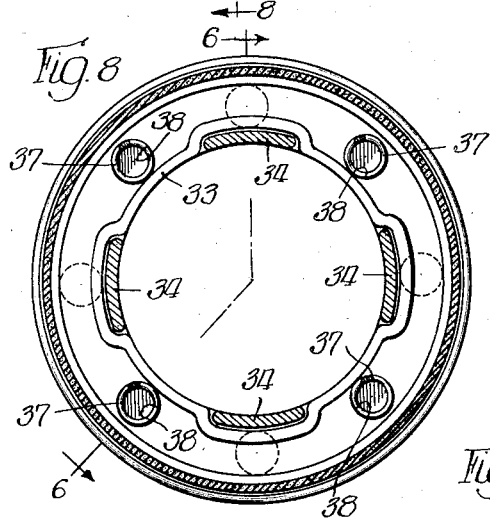
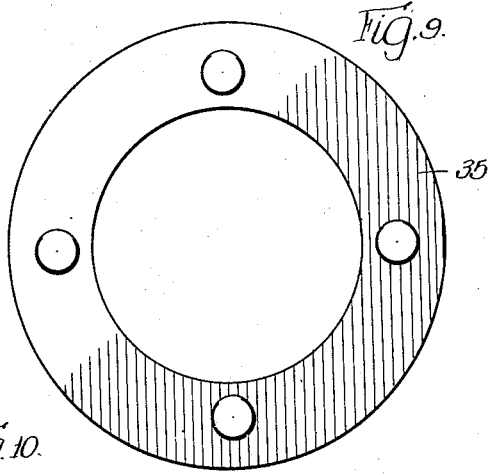
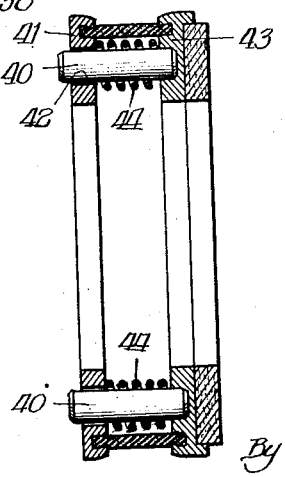
Inventor:
Rudolph J. Vedovell,
By Cromwell, Greist + Warden
attys.

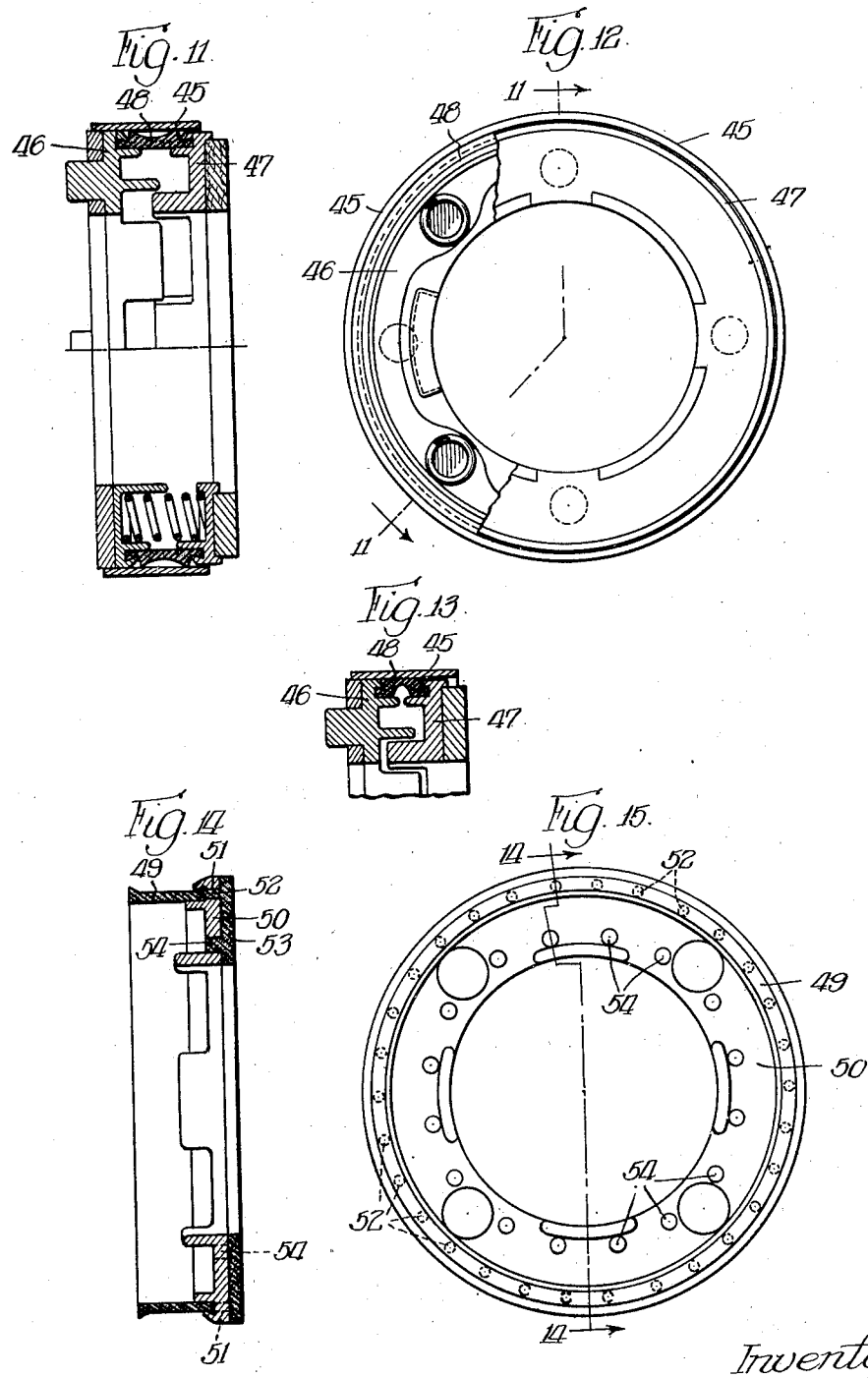

Patented Nov. 10, 1942

2,301,723

UNITED STATES PATENT OFFICE 2,301,723

SEAL

Rudolph J. Vedovell, Chicago, Ill., assignor to Chicago Rawhide Manufacturing Company, Chicago, Ill., a corporation of Illinois Application September 30, 1938, Serial No. 232,556

1 Claim. (Cl. 286—11)

This invention has to do with end-thrust seals of the type ordinarily used about a shaft between two axially separated members for sealing off the space present between such members.

The principal object of this invention is to provide an improved end-thrust seal which is easy to install and remove, will effectively retain oil, grease or other lubricant while excluding dust, water and other foreign matter, is so designed as to compensate readily for endwise movement of the members, and is so constructed as to remain effective over a long period of time under the most severe operating conditions.

Other more specific objects and advantages of the invention will be apparent to those skilled in the art upon a full understanding of the construction of the new seal.

In order that the invention may be readily understood, several different embodiments of the same are presented herein, but it will, of course, be appreciated that the invention is capable of being embodied in various other structurally modified forms coming equally within the scope of the appended claim.

In the accompanying drawings:

Fig. 6 is a diametric section through another seal constructed in accordance with the invention, the section being taken on the irregular line 6—6 of Fig. 7 and the irregular line 6—6 of Fig. 8;

Fig. 7 is a view of one end of the seal shown in Fig. 6;

Fig. 8 is a transverse section through the same seal, taken on the line 8—8 of Fig. 6;

Fig. 9 is a view of the other end of the seal;

Fig. 10 is a diametric section through another seal constructed in accordance with the invention;

Fig. 11 is a diametric section through still another seal constructed in accordance with the invention, the section being taken on the irregular line 11—11 of Fig. 12;

Fig. 12 is a view of one end of the seal shown in Fig. 11, with portions broken away to show the inside of the seal;

Fig. 13 is a fragmentary section, corresponding to the upper portion of Fig. 11, showing the seal in its axially compressed and operative condition;

Fig. 14 is a diametric section through one end only of a different seal, the section being taken on the irregular line 14—14 of Fig. 15; and Fig. 15 is an inside view of the end shown in Fig. 14.

Figure 1:
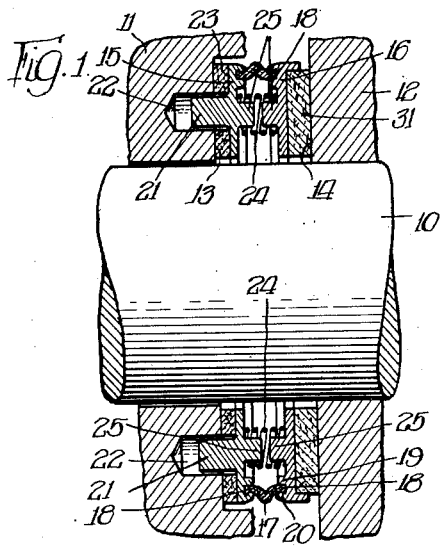
Fig. 1 is a diametric section through a seal constructed in accordance with the invention, showing the same installed about a shaft between two relatively movable machine parts.
Figure 2:
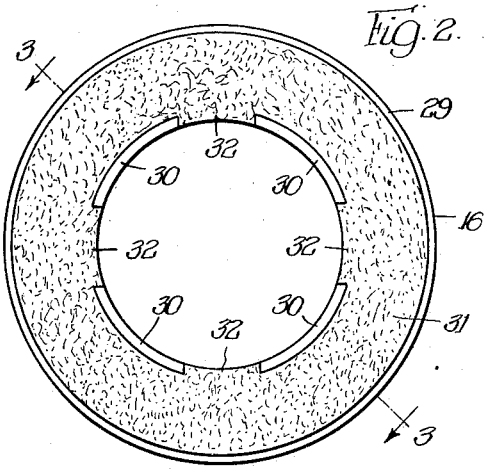
Fig. 2 is a view of one end of the seal shown in Fig. 1.
Figure 3:
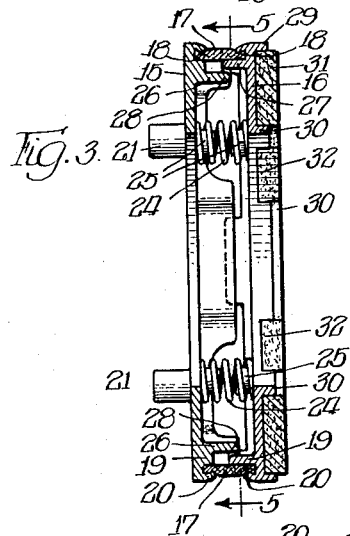
Fig. 3 is a diametric section through the seal, taken on the line 3—3 of Fig. 2 showing the seal in an uncompressed condition before being installed.
Figure 4:
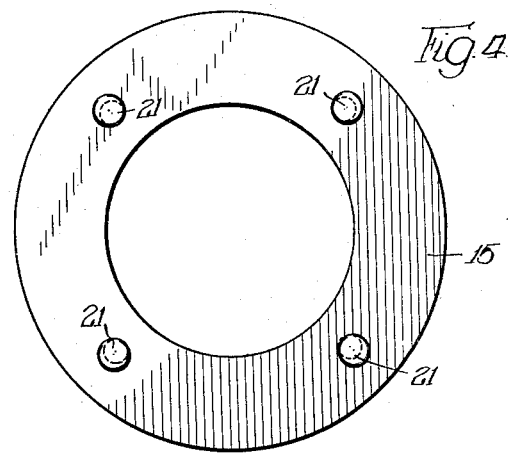
Fig. 4 is a view of the other end of the seal.
Figure 5:
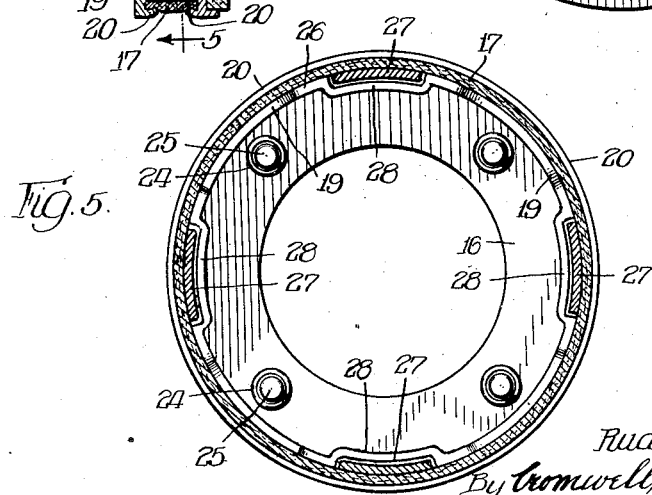
Fig. 5 is a transverse section, taken on the line 5—5 of Fig. 3.

The seal structure shown in Figs. 1 to 5 inclusive will first be described. As shown in Fig. 1, the seal is adapted to be positioned about a shaft 10 between one end of a housing 11 from which the shaft projects and a part 12 which turns with the shaft. The seal when installed is compressed between the opposed annular surfaces 13 and 14 of the members 11 and 12, and in that position serves to retain grease, oil or other lubricant while excluding dust, water and other foreign matter. In installments of this general character the part 12 is not only rotatable with respect to the housing 11 but is also capable of some endwise and possibly some slight sidewise movement with respect to the housing. The improved seal is so designed as to compensate for all such relative movements between the parts.

The seal includes two axially spaced annular plates 15 and 16, which plates may advantageously be made as die castings. These plates are connected together at their outer peripheries by a flexible tubular diaphragm 17 made of leather, synthetic rubber, or other suitable material. The edges of the diaphragm extend into annular grooves 18 formed between concentric annular flanges 19 and 20 on the end plates, and the outer flanges 20 are turned inwardly in order to securely grip such edges.

The end plate 15 is provided with a plurality of integrally formed studs 21 which extend into recesses 22 in the housing 11 for the purpose of anchoring the seal against rotation relative to the housing. A washer 23 of suitable packing material is positioned against the end plate 15 and the opposed surface 13 of the housing, where it acts as a sealing gasket, the washer 23 being apertured at the locations of the studs 21 to accommodate the latter.

The end plates 15 and 16 are resiliently spread apart by a plurality of small coil springs 24, which springs are compressed between the end plates 15 and 16 and are held against displacement by integrally formed projections 25 on the plates. The end plate 15 is provided, inwardly of the flange 19, with an axially extending flange-like formation 26 for circumferentially interlocking coaction with a formation 27 on the opposed portion of the end plate 16. The formation 26, which may be either continuous or interrupted, is provided with a plurality of radial offsets 28 which provide narrow arcuate pockets for the reception of the formations 27, which latter formations are also arcuately shaped and fit loosely and slidably within the pockets. These interfitting arcuate formations on the end plates 15 and 16 prevent the end plate 16 from turning with respect to the anchored end plate 15, and also prevent any substantial sidewise shifting of one plate relative to the other while permitting free axial movement of the plates to compensate for any movement of the part 12 toward or away from the end of the housing 11.

The end plate 16 is provided about its inner and outer edges with rims 29 and 30. These rims provide an annular channel-shaped seat for a packing washer 31 of leather, synthetic rubber or other suitable material. The washer 30 is secured to the end plate 16, preferably by being cemented thereto, and is positively locked against any movement circumferentially of the plate by means of arcuate extensions 32, which arcuate extensions are preferably located about the inner periphery of the washer and interlock with openings of corresponding size and shape formed in the inner flange 30 of the end plate.

The above described seal structure is a self-contained unit which can be easily installed and removed from the machine parts with which it is associated. It is so designed as to compensate readily for all movements ordinarily encountered in such an installation. The simple and durable construction insures a long period of trouble-free service for the seal.

A somewhat modified form of the improved seal is shown in Figs. 6 to 9 inclusive. In this form, the interlocking formations 33 and 34 for preventing relative rotation between the end plates 35 and 36 are located about the inner peripheries of the end plates, instead of about their outer peripheries, and the expansion springs 37, instead of seating flatly against the inner surfaces of the end plates about centering projections, are positioned with their ends set back into locating recesses 38 and 39 formed in the end plates, thus allowing the use of longer and more effective springs.

In the modification shown in Fig. 10, the anchoring studs 40, instead of being formed as integral parts of the end plate 41, extend through apertures 42 in the end plate 41 and are carried by the opposed end plate 43, the portions of the studs 40 between the two end plates serving as the supporting and centering means for the expansion springs 44.

In the modification shown in Figs. 11 to 13 inclusive, a cylindrical sleeve 45 of thin sheet metal is secured to the outer periphery of the inner end plate 46 and slidingly telescopes over the outer periphery of the end plate 47, in encompassing relation to the tubular diaphragm 48. This metal sleeve 45 acts as a constricting casing for the diaphragm 48, to prevent bursting of the latter in the event of high pressure being placed upon the lubricant within the seal.

In the modification shown in Figs. 14 and 15, wherein only the diaphragm 49 and one of the end plates 50 is shown, the end plate 50 is provided at the base of the diaphragm retaining groove 51 with a plurality of apertures 52. The diaphragm 49 and the packing washer 53 are both made of the same synthetic rubber or other moldable material, and are molded together, in the same operation, through the openings 52, the material of the washer 53 also preferably extending through other locking apertures 54 formed in the end plate 50 inwardly of the apertures 52.

I claim:

In a seal of the character described, two thin axially spaced annular plates, a flexible tubular diaphragm connecting the plates, an annular packing member positioned against the outer face of one of the plates, and interfitting arcuate formations projecting axially from the inner faces of both plates, which formations reinforce the plates and permit axial movement of the same while preventing relative rotation or any substantial sidewise shifting of one plate relative to the other, said formations on one of the plates consisting of circumferentially spaced arcuate projections, and said formations on the other plate consisting of complementary projections provided with arcuate pockets having radially disposed end walls and intervening radially offset arcuate side walls.

RUDOLPH J. VEDOVELL.